United States Patent
Payne (10) Patent No.: US 9,592,766 B1
(45) Date of Patent: Mar. 14, 2017

(54) SYSTEMS AND METHODS FOR ADJUSTING A STOPPING POSITION

(71) Applicant: Toyota Motor Engineering & Manufacturing North America, Inc., Erlanger, KY (US)

(72) Inventor: Joshua D. Payne, Irvine, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 37 days.

(21) Appl. No.: 14/835,315

(22) Filed: Aug. 25, 2015

(51) Int. Cl.
  *B60Q 1/00* (2006.01)
  *B60Q 9/00* (2006.01)
  *B60R 21/0134* (2006.01)

(52) U.S. Cl.
  CPC .......... *B60Q 9/008* (2013.01); *B60R 21/0134* (2013.01)

(58) Field of Classification Search
  CPC .............. B60Q 9/008; B60W 2550/30; B60W 2550/308; B60W 30/16
  USPC ... 340/441, 435, 903, 933, 938; 701/96, 301
  See application file for complete search history.

(56) References Cited

U.S. PATENT DOCUMENTS

| | | | |
|---|---|---|---|
| 6,301,530 B1* | 10/2001 | Tamura | G05D 1/024 180/168 |
| 8,041,494 B2 | 10/2011 | Kubotani et al. | |
| 8,155,868 B1 | 4/2012 | Xing et al. | |
| 8,948,995 B2* | 2/2015 | Pandita | B60W 30/17 180/168 |
| 8,995,662 B2 | 3/2015 | Rubin et al. | |
| 2014/0142797 A1 | 5/2014 | Otake | |

FOREIGN PATENT DOCUMENTS

EP 2862768 4/2015

* cited by examiner

*Primary Examiner* — Toan N Pham
(74) *Attorney, Agent, or Firm* — Dinsmore & Shohl LLP (57) ABSTRACT

Systems and methods for adjusting a stopping position are described. One embodiment of a method includes determining a stopping position for a following vehicle on a route, communicating with a leading vehicle to determine whether the leading vehicle is positioned on the route such that the following vehicle requires an adjustment to the stopping position, and adjusting the stopping position, based on the leading vehicle, to create an adjusted stopping position. In some embodiments, the method includes determining a coasting position for the following vehicle, based on the adjusted stopping position and sending a notification to a driver of the following vehicle regarding the coasting position, where the notification indicates to the driver a time to refrain from depressing an accelerator of the following vehicle.

20 Claims, 5 Drawing Sheets

SYSTEMS AND METHODS FOR ADJUSTING A STOPPING POSITION

TECHNICAL FIELD

Embodiments described herein generally relate to systems and methods for adjusting a stopping position and, more specifically, to systems and methods for facilitating vehicle-to-vehicle communication to adjust stopping position.

BACKGROUND

Vehicle design has continued to evolve such that there are many semi-autonomous vehicles that help reduce accidents and increase fuel efficiency. As an example, one current solution uses prediction logic to predict stops along a driver's route. This solution then cues the driver to coast in advance of the stop, thereby increasing fuel economy. While this current solution may be beneficial, the cue given by the current solutions do not account for other vehicles that may be in front of the driver's vehicle, which would make the actual stopping position earlier and cause the cue to be late.

SUMMARY

Systems and methods for adjusting a stopping position are described. One embodiment of a method includes determining a stopping position for a following vehicle on a route, communicating with a leading vehicle to determine whether the leading vehicle is positioned on the route such that the following vehicle requires an adjustment to the stopping position, and adjusting the stopping position, based on the leading vehicle, to create an adjusted stopping position. In some embodiments, the method includes determining a coasting position for the following vehicle, based on the adjusted stopping position and sending a notification to a driver of the following vehicle regarding the coasting position, where the notification indicates to the driver a time to refrain from depressing an accelerator of the following vehicle.

In another embodiment, a system for adjusting a stopping position includes a vehicle computing device for a following vehicle that includes a memory component that, when executed by a processor, causes the system to determine a stopping position for the following vehicle on a route, communicate with a leading vehicle to determine whether at least one of the following: the leading vehicle and a third vehicle is positioned on the route such that the following vehicle requires an adjustment to the stopping position, and adjust the stopping position, based on the communication with the leading vehicle, to create an adjusted stopping position. In some embodiments, the logic causes the system to determine a coasting position for the following vehicle, based on the adjusted stopping position and send a first notification to a driver of the following vehicle regarding the coasting position, where the first notification indicates to the driver a time to refrain from depressing an accelerator of the following vehicle.

In yet another embodiment, a computing device includes a processor and a memory component that stores logic that, when executed by the processor, causes the computing device to determine a stopping position for a following vehicle on a route, communicate with a leading vehicle to determine whether the leading vehicle is positioned on the route such that the following vehicle requires an adjustment to the stopping position, and communicate with a third vehicle to determine whether the third vehicle is positioned on the route such that the following vehicle requires an additional adjustment to the stopping position. In some embodiments, the logic causes the computing device to adjust the stopping position, based on the communication with the leading vehicle and the third vehicle, to create an adjusted stopping position that accommodates presence of the leading vehicle and the third vehicle between the following vehicle and the stopping position, determine a coasting position for the following vehicle, based on the adjusted stopping position, and send a first notification to a driver of the following vehicle regarding the coasting position, where the first notification indicates to the driver a time to refrain from depressing an accelerator of the following vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for adjusting a stopping position. Some embodiments may be configured to use vehicle-to-vehicle cooperative communication to determine if there are any vehicles (e.g., leading vehicles) in front of the driver's vehicle (e.g., the following vehicle) as the driver's vehicle approaches a stop that requires an adjustment to the predicted stopping position. If so, the driver's vehicle may adjust a previously determined stopping position to accommodate for the other vehicle. These embodiments can then give a correctly-timed cue to the driver to start coasting (e.g., a time to refrain from depressing the accelerator) in advance of the stop.

As an example, some embodiments may first learn the various stopping points along a driver's route. The default setting may be configured to notify the driver to begin coasting when he or she reaches a predetermined distance away from the stop relative to current speed (or predicted speed), thereby increasing fuel economy.

Specifically, embodiments may utilize vehicle-to-vehicle cooperative communication to determine if any vehicles are in front of the driver's vehicle, thereby requiring an adjustment to the predetermined stopping position. When another vehicle (e.g., a leading vehicle), is in front of the driver's vehicle (e.g., a following vehicle), as the vehicles approach the stop, leading vehicle notifies the following vehicle that it will be cueing the driver to start coasting at a certain distance before the stop. The following vehicle's system then adjusts its stopping position and cues its driver to start coasting earlier than originally planned. The systems and methods for adjusting a stopping position incorporating the same will be described in more detail, below.

Figure 1:
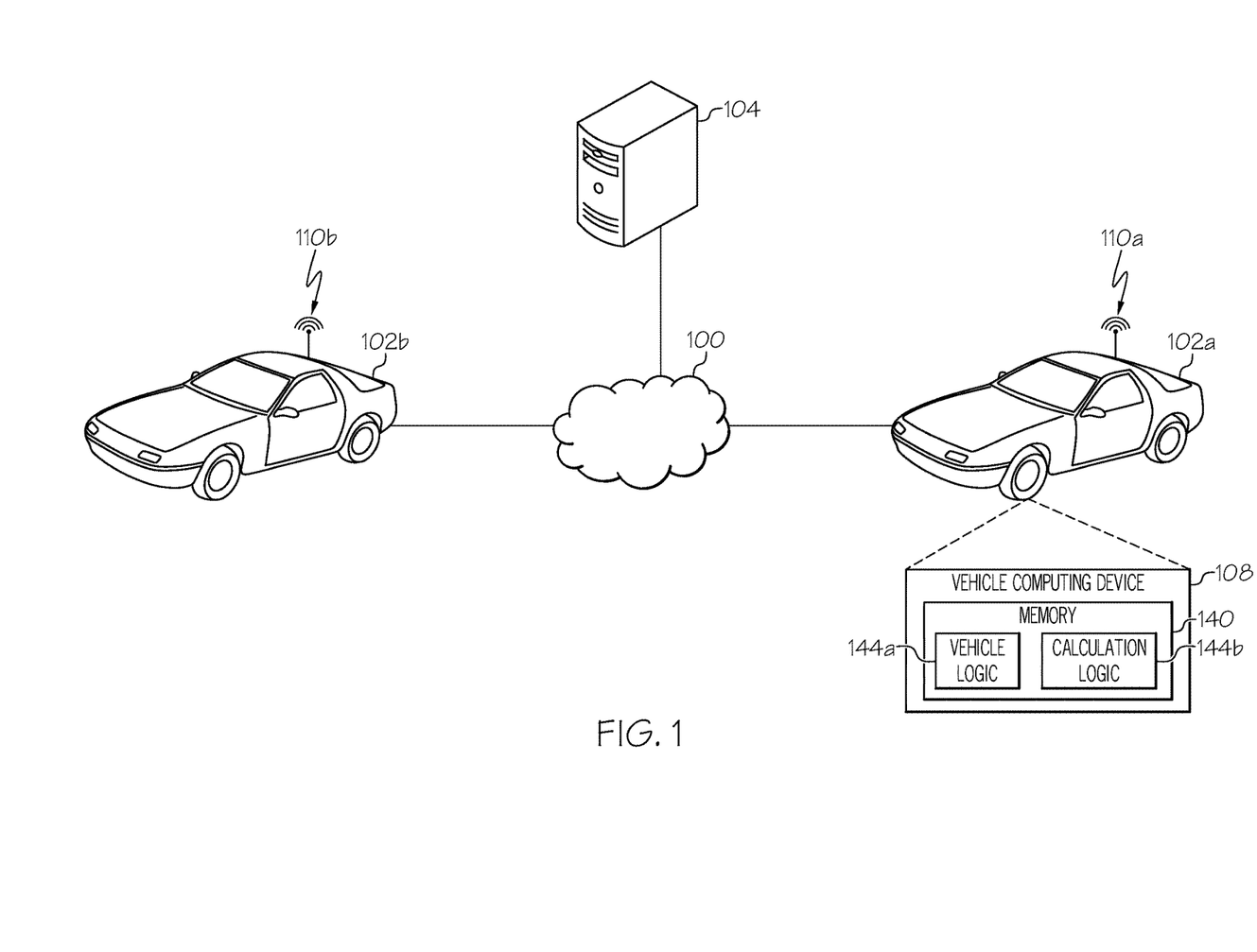
FIG. 1 depicts a computing environment for adjusting a stopping position, according to embodiments described herein.

Referring now to the drawings, FIG. 1 depicts a computing environment for adjusting a stopping position, according to embodiments described herein. As illustrated, the computing environment includes a network 100, a following vehicle 102a, a leading vehicle 102b, and a remote computing device 104. The network 100 may include a wide area network, such as the internet, a mobile device network (such as 3G, 4G, LTE), a public switched telephone network (PSTN), etc. Additionally, the network 100 may include a local area network, such as wireless fidelity (WiFi), Bluetooth™, near field communication (NFC), etc. Accordingly, the network 100 may facilitate communication between two or more devices via an intermediary device or without an intermediary device. As such, depictions of communications between two devices that utilize the network 100 may be direct device-to-device (or vehicle-to-vehicle) communications, depending on the embodiment.

The following vehicle 102a may include any land based passenger or commercial vehicle and thus includes an engine (electric, gasoline, hybrid, etc.), an accelerator for propelling the following vehicle 102a, a braking system, as well as other vehicle components. The following vehicle 102a may also include one or more antenna 110a, 110b for communicating with other vehicles (e.g., the leading vehicle 102b) and/or with the remote computing device 104. As an example, the following vehicle 102a may approach a predetermined stop and receive a signal from the leading vehicle 102b indicating that the leading vehicle 102b is also stopping at the predetermined stop. The communication from leading vehicle 102b may also include a position that the leading vehicle 102b will stop, a recommended position that the following vehicle 102a should stop, a duration of the stop, and/or other data. The following vehicle 102a may receive this information and may adjust its stopping position accordingly.

Additionally, the following vehicle 102a may include a vehicle computing device 108 that includes a memory component 140 that stores vehicle logic 144a and calculation logic 144b. As described in more detail below, the vehicle logic 144a may be configured to determine a likely route and/or likely stops that the following vehicle 102a might take. The vehicle logic 144a may additionally cause the vehicle computing device 108 to communicate with the leading vehicle 102b and/or the remote computing device 104, as described herein. The calculation logic 144b may cause the vehicle computing device 108 to utilize the determined information to determine a stopping position (such as via a positioning system, from historical learned data, from the remote computing device 104, etc.), as well as an adjustment to the determined stopping position, based on information received from another vehicle and/or the vehicle computing device 108. Other components of the vehicle computing device 108 are described with reference to FIG. 6.

The remote computing device 104 may be configured to determine traffic data associated with one or more routes that the following vehicle 102a might traverse, as well as facilitate communication among vehicles 102a, 102b, and/or other vehicles. Specifically, one or more traffic sensors and/or vehicles may communicate traffic information to the remote computing device 104. Additionally, the remote computing device 104 may communicate with the vehicles 102a, 102b to provide the traffic information. The data received from the remote computing device 104 may include an identifier of vehicles (such as the leading vehicle 102b) that might encounter the along the route and/or a predicted stop at which the vehicles might encounter each other such that the following vehicle 102a may directly communicate with that vehicle when the following vehicle 102a is within a predetermined distance of the leading vehicle 102b and/or the predicted stop. Some embodiments may be configured for the remote computing device 104 to additionally receive data from the following vehicle 102a, such as vehicle efficiency data, traffic data the following vehicle 102a is experiencing, and/or other data.

It should be understood that while some embodiments are configured for the remote computing device 104 to communicate data to the following vehicle 102a regarding upcoming stops, this is just one embodiment. Some embodiments may be configured purely for vehicle-to-vehicle communication without the assistance of the remote computing device 104. It should also be understood that while the following vehicle 102a is depicted with hardware and logic, the leading vehicle 102b may also include similar hardware and logic for communicating with the following vehicle 102a.

Figure 2:
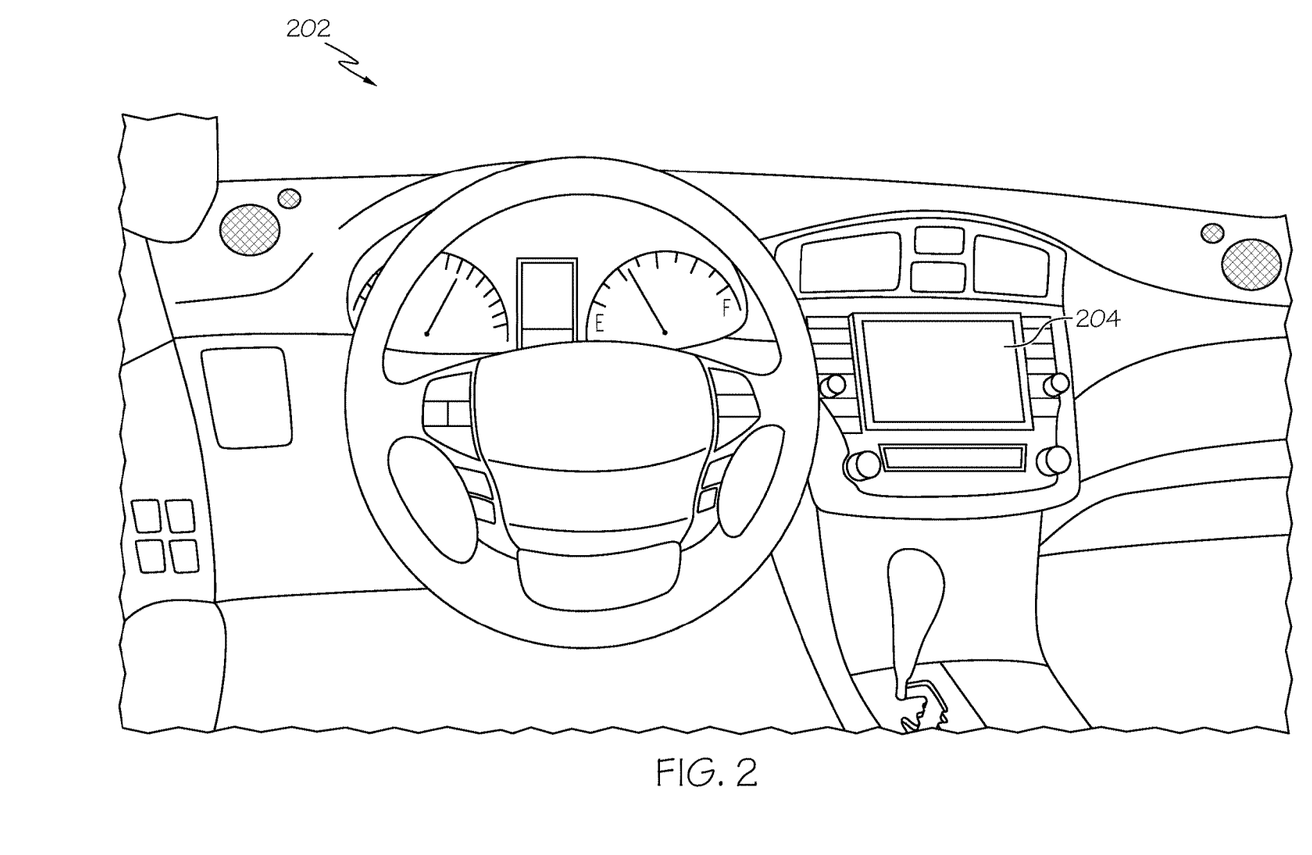
FIG. 2 depicts a vehicle interior for adjusting a stopping position, according to embodiments described herein.

FIG. 2 depicts a vehicle interior 202 for adjusting a stopping position, according to embodiments described herein. As illustrated, the vehicle interior 202 may include a vehicle display 204, which may include a touch screen, visual display, audio display, and/or other hardware components. As discussed above, the vehicle display 204 may be coupled to the vehicle computing device 108 (FIG. 1) and thus may provide one or more user interfaces for driver coaching.

Figure 3:
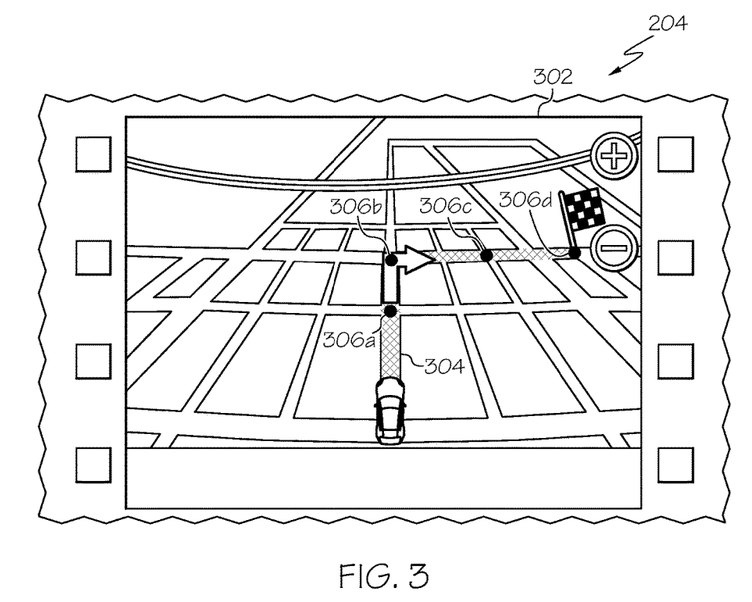
FIG. 3 depicts a user interface for determining a route of a vehicle, according to embodiments described herein.

FIG. 3 depicts a user interface 302 for determining a route of a vehicle, according to embodiments described herein. As illustrated, the user interface 302 may provide a predicted route 304 of the following vehicle. The user interface 302 may also provide likely stops 306a, 306b, 306c, 306d along the predicted route 304. The likely stops 306 may include a stop sign, a stop light, a waypoint, traffic along the route, a destination of the route, etc.

As an example, the vehicle computing device 108 may be configured to determine that there is heavy traffic along the predicted route 304 and that the vehicle will likely be stopping at a point in that traffic. Accordingly, this point may be identified as a potential stop. As the following vehicle 102a approaches the potential stop, the vehicle computing device 108 may facilitate communication with the leading vehicle 102b (which is ahead of the following vehicle 102a) to determine whether to adjust the stopping position. As an example, the leading vehicle 102b may indicate a vehicle length and a stopping position that the leading vehicle 102b will take. The leading vehicle 102b may additionally communicate a likely duration of the stop and/or other information that might be pertinent to determining an adjustment of the stopping position of the following vehicle 102a. Upon receiving the information, the vehicle may provide the driver with an instruction to begin coasting, and/or may initiate an active control to facilitate the stop at the adjusted stopping position.

It should be understood that in some embodiments, the leading vehicle 102b may communicate the appropriate information to the following vehicle 102a, but there is a third vehicle or other obstacle between the following vehicle 102a and the leading vehicle 102b. Accordingly, the following vehicle 102a would be instructed on an incorrect stopping position. Accordingly, some embodiments may be configured with sensors on at least one of the vehicles to determine whether there is an object in front of following vehicle 102a and/or behind leading vehicle 102b. The sensor may include a laser, a camera, a radar, etc. for detecting the presence of an object. Accordingly, if the following vehicle 102a detects that an object is located at a different position than the leading vehicle 102b indicates, the following vehicle 102a will understand that the information provided by the leading vehicle 102b may not be accurate and adjust the stopping position accordingly.

Some embodiments may be configured such that the following vehicle 102a and the leading vehicle 102b each exchange position and stopping information when approaching a stop to determine an adjusted stopping position of each vehicle. As an example, upon approaching a stop, the following vehicle 102a and leading vehicle 102b would exchange information. If the leading vehicle 102b detects an object behind the leading vehicle 102b that is not the following vehicle 102a, the leading vehicle 102b may send data related to the object to the following vehicle 102a for further adjusting the stopping position. Additionally, as the following vehicle 102a may detect an opposite side of the object (because the object is presumably between the following vehicle 102a and the leading vehicle 102b), the following vehicle 102a may be able to more accurately determine the adjusted stopping position.

Figure 4:
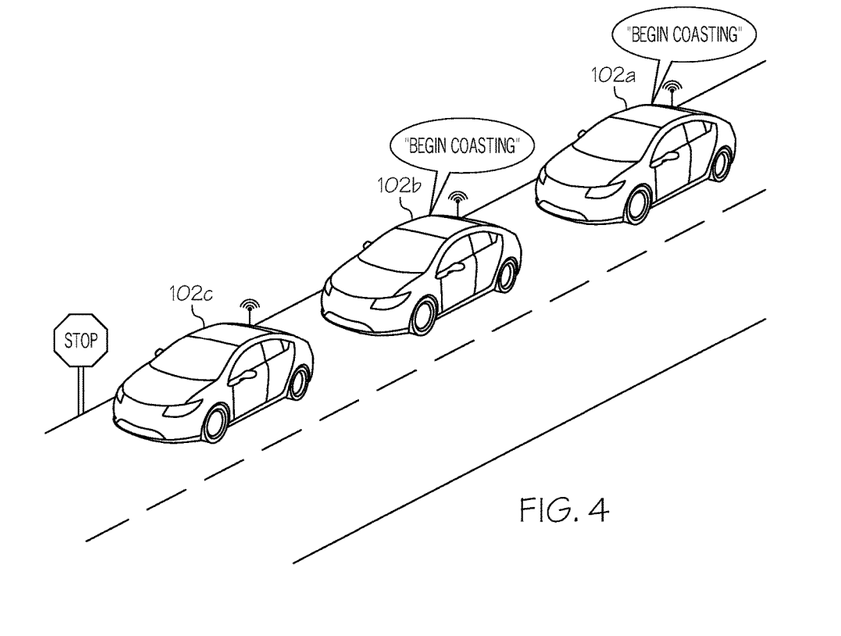
FIG. 4 depicts a plurality of vehicles communicating with each other to alter stopping position, according to embodiments described herein.

FIG. 4 depicts a plurality of vehicles 102a, 102b, 102c communicating with each other to alter stopping position, according to embodiments described herein. As illustrated, the vehicles 102a, 102b, and 102c are approaching a stop. In this embodiment, the following vehicle 102a may have two vehicles (leading vehicle 102b and third vehicle 102c) between the following vehicle 102a and the stopping position. Accordingly, some embodiments may be configured such that the leading vehicle 102b and the third vehicle 102c each independently communicate a stopping position and/or other data to the following vehicle 102a. As the leading vehicle 102b will have an adjusted stopping position due to the third vehicle 102c, the following vehicle 102a may receive this information to adjust its stopping position to accommodate for both the leading vehicle 102b and the third vehicle 102c.

Upon determining the adjusted stopping position, the following vehicle 102a may determine a coasting position to which the driver should begin coasting the following vehicle 102a to reach the adjusted stopping position. The coasting position may be determined based on at least one of the following: a speed of the following vehicle 102a when approaching the adjusted stopping position, determining an environmental condition, determining a payload weight of the following vehicle 102a, and/or other factors. Similarly, some embodiments may be configured to determine a braking position for the driver to begin braking to reach the adjusted stopping position. Additionally, the vehicle computing device 108 may provide a coasting instruction (in the form of a first notification) and/or a braking instruction (in the form of a second notification) to the driver at predetermined times. The first communication and the second communication may be provided as an audio communication, a visual communication, a tactile communication, etc. Additionally, some embodiments may be configured to engage an active control function to facilitate efficient stopping at or around the adjusted stopping position.

It should also be understood that embodiments described herein may also be configured to communicate timing of stops to the following vehicle 102a. As an example, the third vehicle 102c may be stopping as illustrated in FIG. 4, but the stop will be complete by the time the following vehicle 102a reaches the area around stopping position. As such, the third vehicle 102c may communicate a departure time, a remaining stop duration, and/or other information to inform the following vehicle 102a whether the third vehicle 102c will affect the stopping position of the following vehicle 102a. If the following vehicle 102a determines that the third vehicle 102c will have left the stopping position, the adjusted stopping position for the following vehicle 102a will not include the third vehicle 102c.

Figure 5:
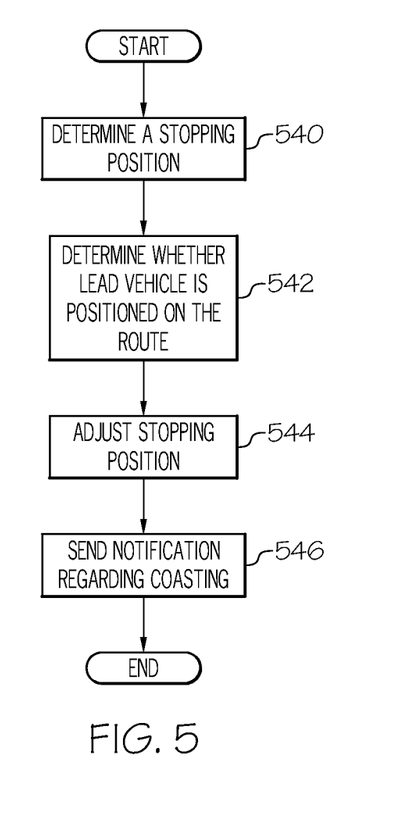
FIG. 5 depicts a flowchart for adjusting a stopping position, according to embodiments described herein.

FIG. 5 depicts a flowchart for adjusting a stopping position, according to embodiments described herein. As illustrated in block 540, a stopping position may be determined. The stopping position may include a position where the following vehicle 102a would stop; assuming no other vehicles or other objects would prevent or deter that stopping position. In block 542, a determination is made regarding whether a leading vehicle 102b is positioned (or will likely be positioned) on the route that the following vehicle 102a is traversing. In block 544, in response to determining that the leading vehicle 102b will likely be positioned on the route and around the stopping position, an adjustment may be made to the stopping position. In block 546, a determination may be made regarding a coasting position to efficiently stop at the adjusted stopping position and first notification of the coasting position may be sent to the driver. A second notification may also be sent regarding a braking position, depending on the particular embodiment.

Figure 6:
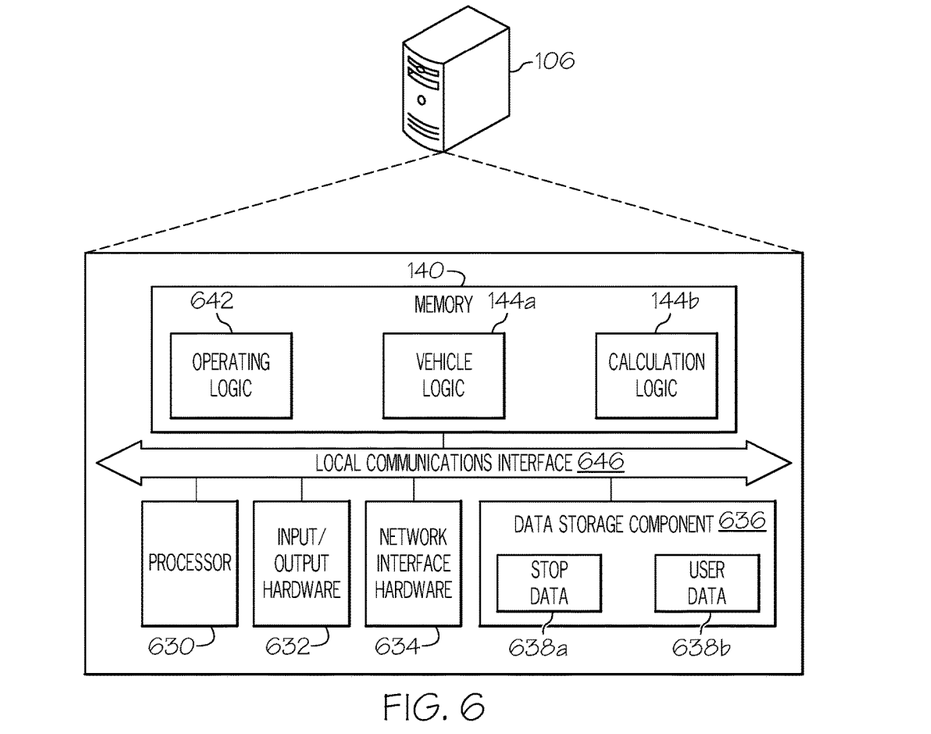
FIG. 6 depicts a vehicle computing device for adjusting a stopping position, according to embodiments described herein.

FIG. 6 depicts a vehicle computing device 108 for adjusting a stopping position, according to embodiments described herein. The vehicle computing device 108 includes a processor 630, input/output hardware 632, network interface hardware 634, a data storage component 636 (which stores stop data 638a, user data 638b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 108 and/or external to the vehicle computing device 108.

The memory component 140 may store operating system logic 642, the vehicle logic 144a and the calculation logic 144b. The vehicle logic 144a and the calculation logic 144b may each include a plurality of different pieces of logic, each of which may be embodied as a computer program, firmware, and/or hardware, as an example. A local interface 646 is also included in FIG. 6 and may be implemented as a bus or other communication interface to facilitate communication among the components of the vehicle computing device 108.

The processor 630 may include any processing component operable to receive and execute instructions (such as from a data storage component 636 and/or the memory component 140). As described above, the input/output hardware 632 may include and/or be configured to interface with the components of FIG. 6.

The network interface hardware 634 may include and/or be configured for communicating with any wired or wireless networking hardware, including an antenna (such as the antennas 110*a*, 110*b*), a modem, a LAN port, wireless fidelity (Wi-Fi) card, WiMax card, mobile communications hardware, and/or other hardware for communicating with other networks and/or devices. From this connection, communication may be facilitated between the vehicle computing device 108 and other computing devices, such as those depicted in FIG. 1.

The operating system logic 642 may include an operating system and/or other software for managing components of the vehicle computing device 108. As discussed above, the vehicle logic 144*a* may reside in the memory component 140 and may be configured to cause the processor 630 to determine a likely route, likely stops that the following vehicle 102*a* might take, and/or cause the vehicle computing device 108 to communicate with the leading vehicle 102*b* and/or the remote computing device 104. Similarly, the calculation logic 144*b* may be utilized to calculate stopping positions, altered stopping positions, coasting positions, and the like.

It should be understood that while the components in FIG. 6 are illustrated as residing within the vehicle computing device 108, this is merely an example. In some embodiments, one or more of the components may reside external to the vehicle computing device 108 and/or the vehicle computing device 108 may be configured as a mobile device. It should also be understood that, while the vehicle computing device 108 is illustrated as a single device, this is also merely an example. In some embodiments, the vehicle logic 144*a* and the calculation logic 144*b* may reside on different computing devices. As an example, one or more of the functionalities and/or components described herein may be provided by the remote computing device 104 and/or other computing devices, which may be coupled to the vehicle computing device 108 via the network 100. These computing devices may also include hardware and/or software for performing the functionality described herein.

Additionally, while the vehicle computing device 108 is illustrated with the vehicle logic 144*a* and the calculation logic 144*b* as separate logical components, this is also an example. In some embodiments, a single piece of logic may cause the vehicle computing device 108 to provide the described functionality.

As illustrated above, various embodiments for adjusting a stopping position are disclosed. These embodiments provide guidance for utilizing the vehicle in an efficient manner, while also accounting for other vehicles and objects on the road.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for adjusting a stopping position. It should also be understood that these embodiments are merely exemplary and are not intended to limit the scope of this disclosure.

What is claimed is:

1. A method for adjusting a stopping position comprising:
   determining, by a computing device, a stopping position for a following vehicle on a route;
   communicating, by the computing device, with a leading vehicle to determine whether the leading vehicle is positioned on the route such that the following vehicle requires an adjustment to the stopping position;
   adjusting, by the computing device, the stopping position, based on the leading vehicle, to create an adjusted stopping position;
   determining, by the computing device, a coasting position for the following vehicle, based on the adjusted stopping position; and
   sending, by the computing device, a notification to a driver of the following vehicle regarding the coasting position, where the notification indicates to the driver a time to refrain from depressing an accelerator of the following vehicle.

2. The method of claim 1, wherein communicating with the leading vehicle comprises communicating at least one of the following between the following vehicle and the leading vehicle: a stopping position of the leading vehicle, a time that the leading vehicle will leave the stopping position of the leading vehicle, a duration that the leading vehicle will be stopped, whether the leading vehicle has detected an object behind the leading vehicle, the adjusted stopping position, and whether the following vehicle has detected an object in front of the following vehicle.

3. The method of claim 1, further comprising communicating with a third vehicle to determine whether the third vehicle is positioned on the route that the following vehicle requires an additional adjustment to the stopping position.

4. The method of claim 1, wherein determining the coasting position includes determining at least one of the following: a speed of the following vehicle when approaching the adjusted stopping position, determining an environmental condition, and determining a payload weight of the following vehicle.

5. The method of claim 1, wherein determining the stopping position includes determining at least one of the following: a stop sign, a stop light, a waypoint, traffic along the route, and a destination of the route.

6. The method of claim 1, further comprising:
   determining a braking position for the following vehicle to begin braking to stop at the adjusted stopping position; and
   sending a second notification to the driver regarding the stopping position.

7. The method of claim 1, further comprising engaging an active control function of the following vehicle to facilitate stopping at the adjusted stopping position.

8. A system for adjusting a stopping position comprising:
   a vehicle computing device for a following vehicle that comprises a memory component that, when executed by a processor, causes the system to perform at least the following:
   determine a stopping position for the following vehicle on a route;
   communicate with a leading vehicle to determine whether at least one of the following: the leading vehicle and a third vehicle is positioned on the route such that the following vehicle requires an adjustment to the stopping position;
   adjust the stopping position, based on the communication with the leading vehicle, to create an adjusted stopping position;
   determine a coasting position for the following vehicle, based on the adjusted stopping position; and
   send a first notification to a driver of the following vehicle regarding the coasting position, wherein the first notification indicates to the driver a time to refrain from depressing an accelerator of the following vehicle.

9. The system of claim 8, wherein communicating with the leading vehicle comprises communicating at least one of the following between the following vehicle and the leading vehicle: a stopping position of the leading vehicle, a time that the leading vehicle will leave the stopping position of the leading vehicle, a duration that the leading vehicle will likely be stopped, whether the leading vehicle has detected an object behind the leading vehicle, the adjusted stopping position, and whether the following vehicle has detected an object in front of the following vehicle.

10. The system of claim 8, further comprising a remote computing device that communicates with the following vehicle to provide the following vehicle with data related to at least one of the following: data regarding the leading vehicle, data regarding the third vehicle, data regarding the route, and data regarding traffic along the route.

11. The system of claim 8, wherein determining the coasting position includes determining at least one of the following: a speed of the following vehicle when approaching the adjusted stopping position, determining an environmental condition, and determining a payload weight of the following vehicle.

12. The system of claim 8, wherein determining the stopping position includes determining at least one of the following: a stop sign, a stop light, a waypoint, traffic along the route, and a destination of the route.

13. The system of claim 8, wherein the logic further causes the system to perform at least the following:
    determine a braking position for the following vehicle to begin braking to stop at the adjusted stopping position; and
    send a notification to the driver regarding the stopping position.

14. The system of claim 8, wherein the logic further causes the system to engage an active control function of the following vehicle to facilitate stopping at the adjusted stopping position.

15. A computing device for adjusting a stopping position comprising:
    a processor; and
    a memory component that stores logic that, when executed by the processor, causes the computing device to perform at least the following:
    determine a stopping position for a following vehicle on a route;
    communicate with a leading vehicle to determine whether the leading vehicle is positioned on the route such that the following vehicle requires an adjustment to the stopping position;
    communicate with a third vehicle to determine whether the third vehicle is positioned on the route such that the following vehicle requires an additional adjustment to the stopping position;
    adjust the stopping position, based on the communication with the leading vehicle and the third vehicle, to create an adjusted stopping position that accommodates presence of the leading vehicle and the third vehicle between the following vehicle and the stopping position;
    determine a coasting position for the following vehicle, based on the adjusted stopping position; and
    send a first notification to a driver of the following vehicle regarding the coasting position, wherein the first notification indicates to the driver a time to refrain from depressing an accelerator of the following vehicle.

16. The computing device of claim 15, wherein communicating with the leading vehicle comprises communicating at least one of the following between the following vehicle and the leading vehicle: a stopping position of the leading vehicle, a time that the leading vehicle will leave the stopping position of the leading vehicle, a duration that the leading vehicle will likely be stopped, whether the leading vehicle has detected an object behind the leading vehicle, the adjusted stopping position, and whether the following vehicle has detected an object in front of the following vehicle.

17. The computing device of claim 15, wherein determining the coasting position includes determining at least one of the following: a speed of the following vehicle when approaching the adjusted stopping position, determining an environmental condition, and determining a payload weight of the following vehicle.

18. The computing device of claim 15, wherein determining the stopping position includes determining at least one of the following: a stop sign, a stop light, a waypoint, traffic along the route, and a destination of the route.

19. The computing device of claim 15, wherein the logic further causes the computing device to perform at least the following:
    determine a braking position for the following vehicle to begin braking to stop at the adjusted stopping position; and
    send a second notification to the driver regarding the stopping position.

20. The computing device of claim 15, wherein the logic further causes the computing device to engage an active control function of the following vehicle to facilitate stopping at the adjusted stopping position.

* * * * *